United States Patent
Laberge et al.

(10) Patent No.: US 10,546,660 B2
(45) Date of Patent: Jan. 28, 2020

(54) APPARATUS AND METHOD FOR GENERATING A VORTEX CAVITY IN A ROTATING FLUID

(71) Applicant: General Fusion Inc., Burnaby (CA)

(72) Inventors: Michel Georges Laberge, West Vancouver (CA); David Franklin Plant, Vancouver (CA); Victoria Suponitsky, Coquitlam (CA); Eunice Kuatsjah, Burnaby (CA)

(73) Assignee: General Fusion Inc., Burnaby, British Columbia (CA)

( * ) Notice: Subject to any disclaimer, the term of this patent is extended or adjusted under 35 U.S.C. 154(b) by 44 days.

(21) Appl. No.: 15/545,646

(22) PCT Filed: Jan. 14, 2016

(86) PCT No.: PCT/CA2016/050032
§ 371 (c)(1),
(2) Date: Jul. 21, 2017

(87) PCT Pub. No.: WO2016/112464
PCT Pub. Date: Jul. 21, 2016

(65) Prior Publication Data
US 2018/0286522 A1    Oct. 4, 2018

Related U.S. Application Data

(60) Provisional application No. 62/103,992, filed on Jan. 15, 2015.

(51) Int. Cl.
*G21B 3/00* (2006.01)
*F15D 1/00* (2006.01)
(Continued)

(52) U.S. Cl.
CPC ............ *G21B 3/008* (2013.01); *B01F 5/0065* (2013.01); *F15B 21/12* (2013.01); *F15D 1/0015* (2013.01); *F15D 1/0095* (2013.01)

(58) Field of Classification Search
CPC .............................. B01F 5/0065; G21B 3/008
(Continued)

(56) References Cited

U.S. PATENT DOCUMENTS 3,013,866 A * 12/1961 Samaniego ........ B01D 11/0434
366/307
3,343,790 A     9/1967 Bowles
(Continued)

FOREIGN PATENT DOCUMENTS

WO    WO 2016/112464 A1    7/2016

OTHER PUBLICATIONS

Itoh, Yasuyuki et al., "Liquid Metal Liner Implosion Systems with Blade Lattice for Fusion," Journal of Nuclear Science and Technology, vol. 17, No. 3, Mar. 1980, pp. 167-178.
(Continued)

*Primary Examiner* — Tony G Soohoo
*Assistant Examiner* — Elizabeth Insler
(74) *Attorney, Agent, or Firm* — Knobbe, Martens, Olson & Bear LLP

(57) ABSTRACT

Examples of system for generating vortex cavity are disclosed. The system comprises a vessel into which a fluid is injected through one or more inlet ports and a fluid circulating system configured to circulate the fluid through the vessel such that the fluid is removed from the vessel through an outlet port and is returned back into the vessel through the one and more inlet ports. A first spinner is mounted at one wall of the vessel while a second spinner is mounted at the opposite wall of the vessel such that the second spinner is at some distance away from the first spinner and it faces the
(Continued)

first spinner. When the fluid circulating system starts circulating the fluid within the vessel a vortex cavity is formed that extends between the first and the second spinners so that one end of the vortex cavity sits on the first spinner while the opposite end of the vortex cavity sits on the second spinner.

16 Claims, 6 Drawing Sheets

(51) Int. Cl.
*F15B 21/12* (2006.01)
*B01F 5/00* (2006.01)

(58) Field of Classification Search
USPC ..................................................... 366/165.3
See application file for complete search history.

(56) References Cited

U.S. PATENT DOCUMENTS

| | | | |
|---|---|---|---|
| 3,468,327 A | 7/1969 | Jones et al. | |
| 4,217,171 A | 8/1980 | Schaffer | |
| 4,252,605 A | 2/1981 | Schaffer | |
| 4,269,658 A | 5/1981 | Ohkawa | |
| 5,005,356 A | 4/1991 | Saunders | |
| 5,073,262 A * | 12/1991 | Ahlberg | B01D 33/23 |
| | | | 210/321.68 |
| 5,229,014 A | 7/1993 | Collins | |
| 5,635,068 A | 6/1997 | Marandi | |
| 5,746,789 A | 5/1998 | Wright et al. | |
| 5,810,474 A * | 9/1998 | Hidalgo | B01F 5/0683 |
| | | | 366/119 |
| 6,451,080 B1 | 9/2002 | Rocklitz et al. | |
| 7,150,149 B2 | 12/2006 | Rochester et al. | |
| 7,862,302 B2 | 1/2011 | Harman | |
| 8,537,958 B2 | 9/2013 | Laberge et al. | |
| 8,584,706 B2 | 11/2013 | Ovesen et al. | |
| 9,267,515 B2 | 2/2016 | Suponitsky et al. | |
| 2006/0198483 A1 | 9/2006 | Laberge et al. | |
| 2010/0163130 A1 | 7/2010 | Laberge et al. | |
| 2011/0064568 A1 | 3/2011 | Day | |
| 2011/0083751 A1 | 4/2011 | Ovesen et al. | |
| 2011/0252815 A1 | 10/2011 | Bakos | |
| 2012/0097280 A1 | 4/2012 | Hallberg et al. | |
| 2012/0139259 A1 | 6/2012 | Glezer et al. | |
| 2014/0158639 A1* | 6/2014 | Caulkins | C02F 1/68 |
| | | | 210/758 |

OTHER PUBLICATIONS

M. Delage et al., "Progress Towards Acoustic Magnetized Target Fusion: An Overview of the R&D Program at General Fusion", 33rd Ann. Conf. Can. Nuc. Soc., Jun. 2012, in 13 pages.
International Search Report and Written Opinion in corresponding International Patent Application No. PCT/CA2016/050032, dated Feb. 10, 2016, in 9 pages.

* cited by examiner

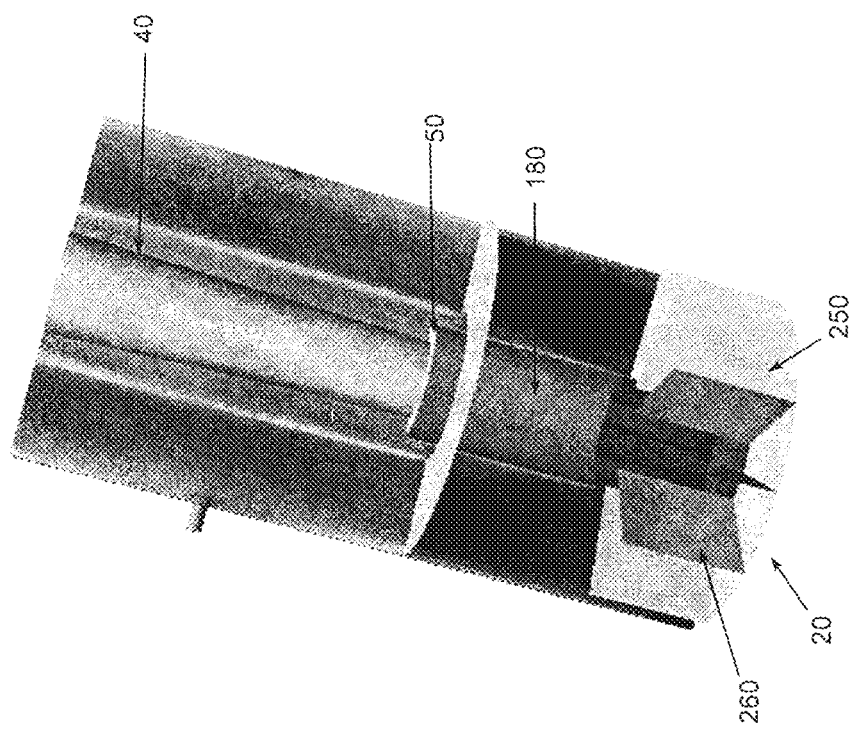
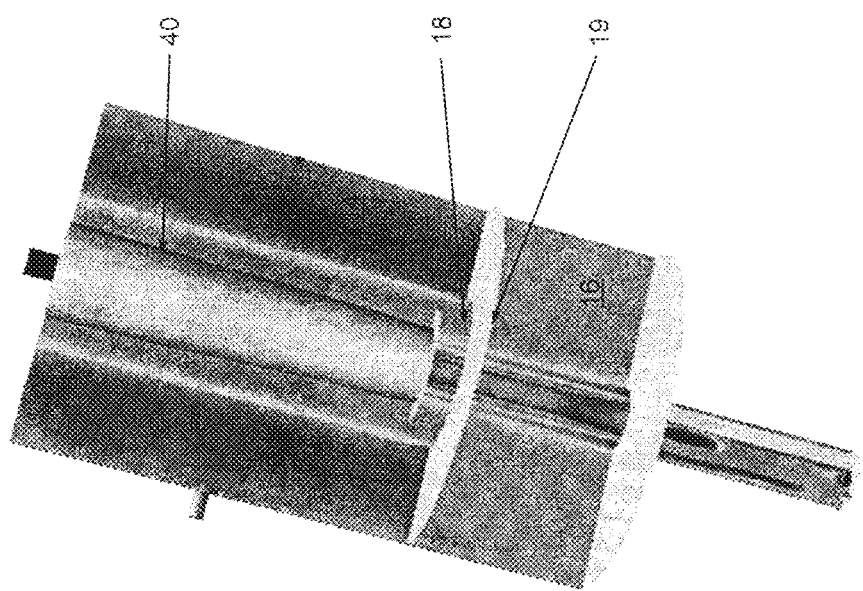
FIGURE 4B
FIGURE 4A

APPARATUS AND METHOD FOR GENERATING A VORTEX CAVITY IN A ROTATING FLUID

TECHNICAL FIELD

The present disclosure relates generally to an apparatus and method for generating a vortex cavity in a rotating fluid, such as an apparatus and method for generating a vortex cavity in a rotating fluid of a plasma compression system.

BACKGROUND

Unless otherwise indicated herein, the materials described in this section are not prior art to the claims in this application and are not admitted to be prior art by inclusion in this section.

A smooth evacuated cavity inside a volume of liquid medium is an essential part of a plasma compression system that is in development at General Fusion Inc., in Burnaby, Canada. The evacuated cavity or also called vortex cavity is created in a center of a plasma compression vessel filled with a molten metal, such as a molten lead-lithium. A pumping system is used to provide a rotational flow of the fluid in the compression vessel and create the cavity which can be gas or vacuum cavity. Plasma is injected into such cavity and is then compressed with a converging pressure wave that collapses the cavity compressing the plasma therein.

Prior experiments have been conducted using water and/or liquid lead pumping systems to produce a vortex cavity. The pumping system in some of these systems was based on a concept of a bath tub vortex in which a cavity is formed as a result of tangential pumping of the liquid into a compression vessel and draining the liquid out from a hole on the bottom of such vessel. Even though such systems were successful in forming the vortex cavity, problems have been identified, such as for example, a case where the cavity extends over the entire vessel and enters into a draining pipe, such that the obtained vortex cavity was lacking a desired smoothness of the liquid/gas interface. The lack of smoothness of the interface, i.e. a persistent existence of the high-frequency surface ripples, has been attributed to a presence of strong vertical shear layers in the vicinity of the interface as well as interaction of the rotating interface (top and bottom of the vortex) with stationary walls of the vessel. The vortex cavity extends over the entire height of the vessel, touching the stationary wall at the top of the vessel and entering the drainage hole at the bottom of the vessel. When the vortex cavity extends into a drainage hole, it may block a significant part of the drainage area which can result in a significant increase in the vertical velocity (and shear) near the vortex interface which in turn can lead to destabilizing (e.g. precession) of the vortex and poor quality of its surface. In addition to this, the amount of fluid in the system cannot be fixed, i.e. fluid injection and fluid drainage are decoupled (open system), leading to a difficulty in controlling and/or predicting the exact parameters of the generated vortex cavity.

SUMMARY

In one aspect, an apparatus for generating a vortex cavity in a rotating fluid is provided. The apparatus comprises a vessel with a first spinner that has a rotatable face surface which is rotatably mounted inside the vessel and a second spinner with a rotatable face surface which is rotatably mounted inside the vessel so that the second spinner rotatable face surface is coaxial with and facing the first spinner rotatable face surface. The apparatus also comprises at least one fluid injection inlet that is in fluid communication with the inside of the vessel and is positioned between the first and second spinners such that the rotation fluid can be injected into the vessel in a manner that causes rotational flow of the fluid between the first and second spinners. The apparatus also includes a fluid pump which is coupled to the at least one fluid injection inlet to inject the rotation fluid into the vessel such that the fluid rotates in the vessel with sufficient angular momentum to form a vortex cavity that extends between the first and second spinners. The vortex cavity has a radius smaller than the radii of the first and second spinners such that one end of the vortex cavity sits on the first spinner rotatable face surface and an opposite end of the vortex cavity sits on the second spinner rotatable face surface. The apparatus also includes at least one rotation fluid draining outlet that is in fluid communication with the inside of the vessel, and which is spaced from the first and second spinners by a sufficient distance to allow the fluid to drain from the vessel.

In one aspect, the at least one rotation fluid draining outlet is coaxial with the first and second spinners.

The apparatus can further comprise a piping network that is fluidly coupled to the fluid pump and to the at least one injection inlet and the at least one draining outlet so that the fluid discharged from the vessel via the at least one draining outlet is recirculated back into the vessel via the at least one injection inlet.

In one aspect, at least one of the first and second spinners can further comprise a central opening surrounded by a solid rim that has a width sufficient to support the vortex cavity. The at least one of the first and second spinners can be a hollow tube with the central opening and a sidewall defining a solid rim to support the vortex cavity. The hollow tube can further comprise a slit that extends along a circumference of an inner face of the sidewall, and a movable lid and a driver that is configured to drive the movable lid between a first position that closes the central opening and a second position that does not close the central opening.

In another aspect, the apparatus can further comprise at least one motor to rotate the first and second spinners, and a controller in electrical communication with the at least one motor programmed to adjust the rotational speed of the first and second spinners respectively.

In one aspect, the first and second spinners can further comprise a plurality of fins that are connected to and extend away from a bottom surface of the first and second spinners so that the plurality of fins are oriented substantially perpendicular to a rotational direction of the rotation fluid.

In another aspect, a plasma compression system employing a vortex generator is provided. The plasma compression system comprises a plasma compression chamber for containing a rotation fluid therein, at least one rotation fluid injection inlet and at least one rotation fluid draining outlet spaced from the at least one rotation fluid injection inlet. An outside wall defines an inner space of the chamber. The system further comprises at least one plasma generator configured to generate and inject plasma into the inner space of the chamber. The plasma generator has a discharge outlet that is in fluid communication with the inner space of the plasma compression chamber so that the generated plasma can be discharged into the chamber. A pressure wave generator with a plurality of pistons arranged around the chamber is provided such that pistons operate to impact the outside wall of the chamber and generate a converging pressure wave into the rotation fluid contained in the inner space of the chamber. The system also comprises a vortex generator to form a vortex cavity in the chamber. The vortex generator comprises a first spinner with a rotatable face surface that is rotatably mounted inside the chamber and a second spinner with a rotatable face surface rotatably mounted inside the chamber. The at least one fluid injection inlet is located between the first and second spinners and is in fluid communication with the inner space such that the rotation fluid can be injected into the plasma compression chamber in a manner that causes rotational flow of the rotation fluid between the first and second spinners. The at least one rotation fluid draining outlet that is also in fluid communication with the inner space is spaced from the first and second spinners by a sufficient distance to allow the rotation fluid to drain from the plasma compression chamber. A fluid pump that is coupled to the at least one fluid injection inlet operates to inject the rotation fluid into the chamber such that the fluid rotates with a sufficient angular momentum to form a vortex cavity that extends between the first and second spinners so that one end of the vortex cavity sits on the rotatable face surface of the first spinner and an opposite end of the vortex cavity sits on the rotatable face surface of the second spinner. At least one of the first and second spinners comprises a central opening surrounded by a solid rim that has a width sufficient to support the vortex cavity. The central opening is aligned with the discharge outlet of the plasma generator such that the plasma discharged by the plasma generator enters the vortex cavity.

In yet another aspect, a method for generating a vortex cavity in a plasma compression system is provided. The method comprises providing a first spinner and a second spinner inside a plasma compression chamber so that the second spinner is spaced from the first spinner. The first and second spinners each have a rotatable face surface mounted inside the chamber such that the first and second rotatable face surfaces are coaxial with and face each other. The method further comprises circulating a rotation fluid inside the plasma compression chamber with sufficient angular momentum to form a vortex cavity that extends between the first and second spinners and rotating the rotatable face surfaces of the first and second spinners at a velocity such that a first end of the vortex cavity is seated on the rotatable face surface of the first spinner and an opposite second end of the vortex cavity is seated on the rotatable face surface of the second spinner.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIG. 4A is a schematic perspective view of a vortex formation in the apparatus shown in FIG. 3A;

FIG. 4B is a schematic perspective view of a vortex formation in the apparatus shown in FIG. 3B;

DETAILED DESCRIPTION OF SPECIFIC EMBODIMENTS

Embodiments of the present invention described herein relate to an apparatus capable of producing a vortex cavity in a rotating fluid ("rotation fluid"). The apparatus can be implemented in a plasma compression system, such as a system developed at General Fusion Inc. The apparatus generally includes a vessel with a fluid injection inlet and a fluid draining outlet that is spaced from the inlet. The inlet is coupled to a fluid pump which can be operated to control an exact amount of fluid in the vessel and can also cause the fluid to circulate in the vessel and form a vortex cavity in the fluid. The pump can be operated to control the size/geometry of the vortex cavity, by changing the amount of fluid within the vessel. The apparatus also includes a first spinner located at one end of the vessel ("first end") and a second spinner located at another end of the vessel ("second end"). The first and second spinners each comprise a rotatable member with a surface facing the vortex such that a formed vortex can "sit" on the spinner surfaces; the first and second spinners are rotatable at about the same speed as the vortex, which may prevent formation of high frequency ripples on the vortex surface. The second spinner may be placed over the draining outlet by a pre-determined distance to prevent the vortex from extending to the outlet. Such placement may also prevent shear layers from forming in the vortex. The fluid can be a liquid, such as molten lead, or a fluid mixture such as a liquid—solid suspension, or even a gas. The vortex cavity can comprise a gas, plasma, or a vacuum.

Figure 1:
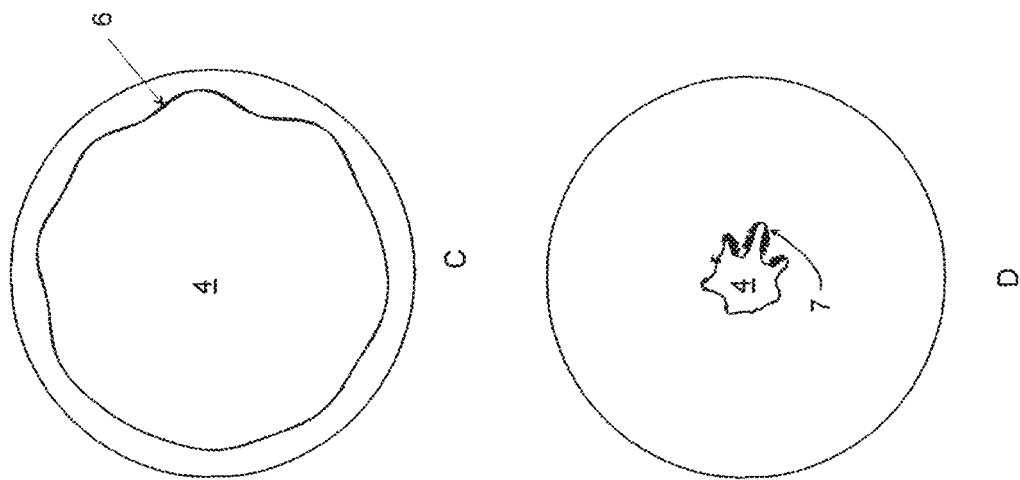
FIGS. 1A-1D are schematic cross-sectional views of simulations showing developments of hydrodynamic instabilities at a gas-liquid interface during a collapse of a vortex cavity for two amplitudes of an initial perturbation at the gas-liquid interface.
Figure 1:
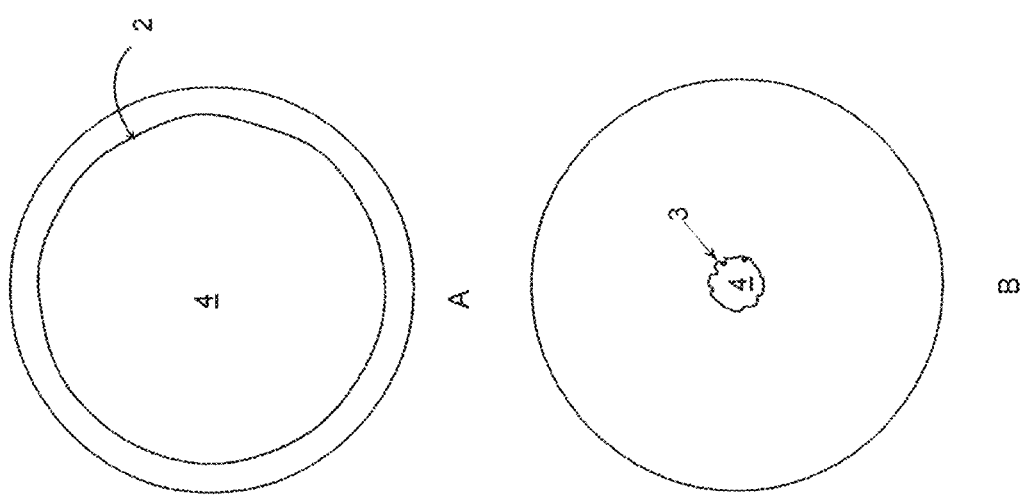

The investigations conducted over the previous years at General Fusion Inc. have shown that any imperfections initially existing on the liquid/gas interface (in particular those having high wave numbers) may initiate development of hydrodynamic instabilities and influence the compression efficiency of the plasma during cavity collapse. FIG. 1 illustrates an example of simulations conducted at General Fusion Inc. showing the development of hydrodynamic instabilities during a collapse of a gas (vortex) cavity for different amplitudes of initial perturbations at the gas-liquid interface. FIG. 1A shows a vortex cavity 4 with a gas/liquid interface illustrated with curve 2 before a pressure wave reaches the interface 2. As can be noticed there are some small initial perturbations at the interface 2. When the pressure wave collapses the cavity 4 (see FIG. 1B) such initial perturbations can trigger hydrodynamic instabilities shown by the curve 3. FIG. 1C illustrates another example of the gas/liquid interface (curve 6) with higher amplitude of initial perturbations than the example shown in FIG. 1A. Since the initial perturbations at the interface 6 are bigger, such initial perturbations can result in stronger distortion of the interface once the pressure wave collapses the cavity 4 (see FIG. 1D). As it can be noticed in FIG. 1D the initial perturbations at the interface 6 can result in developing a sharp spikes and bubbles at the gas/liquid interface as represented by curve 7. It is therefore clear that high quality of a created vortex cavity, e.g. smoothness of the liquid/gas or liquid/vacuum interface between a rotating liquid and a gas or vacuum vortex cavity, is relevant to achieve a desired compression efficiency.

Figure 2B:
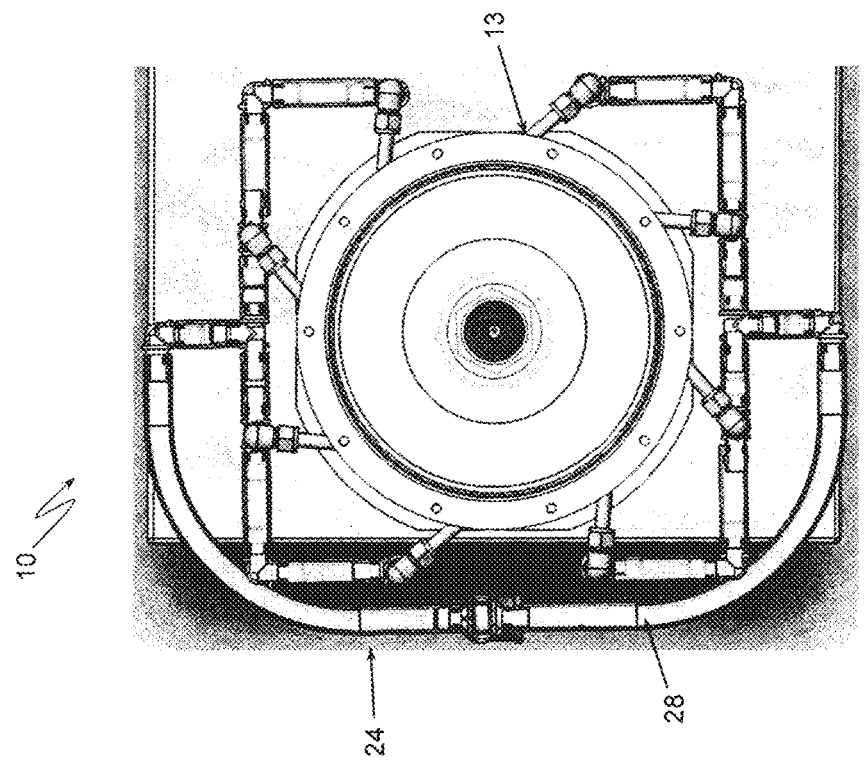
FIG. 2B is a top cross-sectional view of the apparatus shown in FIG. 2A.
Figure 2A:
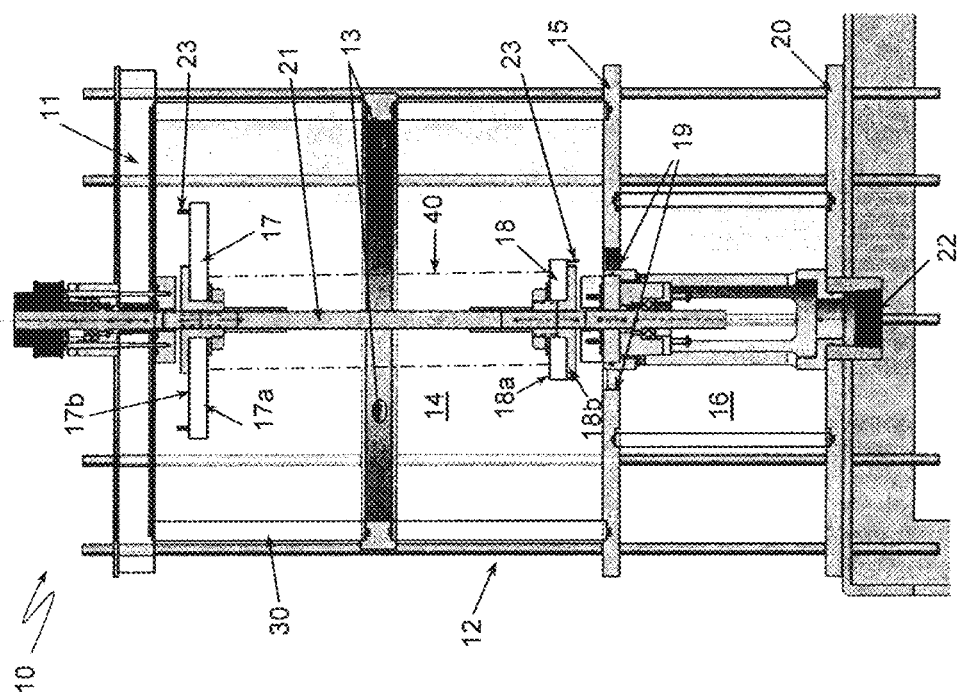
FIG. 2A is a cross-sectional side view of an apparatus for generating a vortex cavity according to one embodiment.

FIGS. 2A and 2B show an example of one embodiment of a vortex generation system 10 of the present invention. The system 10 can be a closed loop pumping system that can include a vessel 12 into which a fluid ("rotation fluid") is injected from at least one injection inlet 13, a fluid circulating (pumping) system 24 (see FIG. 2B) and at least one draining outlet 22. The vessel 12 can have a first end (top wall) 11, a second end (bottom wall) 20 and a sidewall 30 to define an inner space of the vessel 12. The rotation fluid is injected into the vessel 12 tangentially through the inlets 13 and is drained out from the second end 20 of the vessel 12 through the outlet 22. The at least one injection inlet is equatorially positioned (or near vessel's equator) and away from ends 11 and 20. The at least one draining outlet 22 is formed at one of the first or second ends 11, 20, and is spaced apart from the at least one injection inlet 13. In the illustrated example the draining outlet 22 is formed in the second end 20 but person skilled in the art would understand that the inlet ports 13 and/or the draining outlet 22 can be positioned at any other suitable position without departing from the scope of the invention as long as the rotation fluid within the vessel 12 is spun so that the injected angular momentum is such that a vortex cavity 40 can be created within such vessel. For example, the draining outlet 22 can be positioned at the top (first end 11) or the fluid can be drained out through the draining outlets 22 formed at both ends 11, 20.

A first spinner 17 is rotatably mounted in the vessel 12, such as for example in proximity to the first end 11, while a second spinner 18 is rotatably mounted at some distance opposite and facing the first spinner 17, Both of the spinners 17, 18 can comprise a rotatable face surface 17a, 18a that rotates at a speed that is the same to the local tangential flow velocity of the fluid. The first and second spinners 17 and 18 can be coaxial with the rotatable face surface 17a facing the rotatable face surface 18a so that one end of the vortex cavity sits on the face surface 17a while the opposite end of the vortex sits on the face surface 18a. The at least one draining outlet 22 is positioned at a pre-determined distance under the second spinner 18. The reason for this is that in the vicinity of the fluid drainage high gradients in the vertical velocity component (shear layers) are formed so that any pre-existing perturbations (disturbances) in the system may be subjected to a rapid amplification by such shear layers. The shear layers can be formed at radial distance (which is correlated to the radius of the draining hole) and can extend to some distance above the outlet 22. Thus, a spinner that is in vicinity to a draining outlet needs to be positioned at a sufficient distance away from the draining outlet in order not to constrain flow at the draining outlet, so that the amount of fluid injected into the vessel 12 at any time can correspond to the amount of fluid drained out of the vessel, keeping the amount of rotating fluid in the vessel constant. The spinner which is further away from the draining outlet, e.g. the first spinner 17, can be mounted to the wall (e.g. at first end 11) with sufficient spacing from the wall to allow the rotating surface 17a to rotate, or at some greater distance without departing from the scope of the invention since no draining opening exists in proximity to the first spinner 17. In one implementation, the system 10 can comprise two draining openings, such as for example one additional outlet at the first end 11 in addition to the one at the second end 20. In such implementation, both spinners 17 and 18 are positioned at a sufficient distance away from the respective draining outlets to avoid constraining flow of rotating fluid out of the draining outlets. The distance between the draining outlet 22 and the nearest spinner (e.g. second spinner 18) can be determined by a ratio of a size of the spinner and a size of the draining outlet. For example, if the size (radius) of the draining outlet 22 is smaller than the size (radius) of the nearest spinner (second spinner 18), then such spinner should be positioned further away, at greater distance, from the draining outlet 22 since the spinner may constrain fluid flow resulting in increased velocity. If the size (radius) of the draining outlet 22 is bigger than the size of the nearest spinner, the distance between the outlet 22 and such spinner can be smaller, such that for example the rotating face surface 18a is slightly above the draining outlet 22. For example, for an apparatus 10 with an annular draining outlet with an outer radius of about 6.2 cm and an inner radius of about 3.2 cm, and a spinner with a radius of about 4.6 cm, the distance between the spinner and the draining outlet can be about 2.5 cm.

The at least one draining outlet 22 can be substantially coaxial with the first and second spinners 17, 18. For example the at least one draining outlet 22 can be a circular opening (hole) formed in the second end 20 or an annular ring formed therein, and can be substantially coaxial with the first and second spinners 17, 18, such that the center of the annular ring can be on the axis of the spinners 17, 18. In one implementation the draining outlet 22 can comprise a plurality of small openings arranged in an annular ring, such that the center of the annular ring can be on the axis the first and second spinners 17, 18.

The inner space of the vessel 12 can be partially filled with the rotation fluid, such as, for example a liquid medium. Initially, the system 10 can be filled with a pre-determined volume of rotation fluid calculated based on the expected vortex dimensions and system parameters. The pumping system 24 can comprise one or more fluid pumps 26 (FIG. 6) that can start pumping the rotation fluid to circulate the rotation fluid into the inner space of the vessel 12. The fluid pump 26 can be coupled with the at least one injection inlets 13 so that the pump 26 can inject the rotation fluid into the inner space of the vessel 12 such that the rotation fluid rotates in the vessel with sufficient angular momentum to form the vortex cavity 40 that extends between the first and second spinners 17 and 18. The vortex cavity 40 has a radius smaller than the radii of the first and second spinners 17, 18. The fluid circulating system 24 can further comprise a piping network 28 (see FIG. 2B and FIG. 6) that is fluidly coupled to the one or more fluid pumps 26 and to the at least one fluid injection inlet 13 and the at least one fluid draining outlet 22 such that the rotation fluid discharged from the vessel 12 via the at least one fluid draining outlet 22 is recirculated back into the vessel 12 via the at least one fluid injection inlet 13. Direct connection between the outlet 22 and the pumping system 24 ensures that a fixed amount of rotation fluid circulates into the system 10. The vessel 12 can be cylindrical, spherical or any other suitable shape or size without departing from the scope of the invention as long as the pumping system, the at least one injection inlet and the at least one draining outlet are configured so that the rotation fluid rotates with sufficient angular momentum to form the vortex cavity and the fluid drainage is unconstrained and away from the nearest spinner.

The first spinner 17 can be a disk with a radius that can be equal or bigger than the radius of the second spinner 18 (in case the formed vortex cavity 40 has a slightly conical shape); vice versa, the second spinner 18 can have a bigger radius than the first spinner 17 in art inverted configuration of the system 10. The second spinner 18 can also be a disk. Both spinners 17 and 18 have radii that are bigger than an expected radius of the vortex cavity so that the vortex cavity 40 can sit in between the two spinners 17 and 18. One end of the vortex cavity can sit on the Face surface 17a of the first spinner 17 while the opposite end of the vortex cavity can sit on the face surface 18a of the second spinner 18.

In one implementation, the vessel 12 can further comprise a first chamber 14 and a second chamber 16 separated from the first chamber 14 by a separating wall 15. The first and the second spinners 17, 18 are positioned within the first chamber 14 such that the first spinner 17 is mounted in proximity to the first end 11 while the second spinner 18 is mounted in proximity to the separating wall 15. The pump 26 injects the rotation fluid into the first chamber 14. At least one opening 19 can be formed into the separating wall 15 so that the rotation fluid that is injected into the first chamber 14 is drained through the opening 19 into the second chamber 16. The rotation fluid is then removed out of the second chamber 16 through the draining outlet 22. The opening 19 can be of circular or annular shape or any other suitable shape as long as it at a pre-determined distance under the nearest spinner, such as the second spinner 18. In one implementation, the opening 19 can be a plurality of openings 19 formed in the separating wall 15 under the nearest spinner (e.g. second spinner 18). The second spinner 18 can be positioned at a pre-determined distance above the opening 19 to avoid formation of shear layers in the vicinity of the fluid drainage.

The position and/or the size of the spinner should be such so that it does not block the efficient draining of the rotation fluid. For example, the radius of the second spinner 18 can be slightly smaller than the radius of the draining opening i.e. the opening 19. In one implementation, the radius of the second spinner 18 can be bigger than the radius of the opening 19 and an efficient drainage can be provided by positioning the second spinner 18 further away (above) from the opening 19, so that the size of the spinner 18 does not obstruct the efficient drainage.

Each of the spinners 17 and 18 can be connected to a motor (see motor 27 in FIG. 6) which can be configured to rotate the spinners 17 and 18 over a range of speeds. In one implementation, each of the spinners 17 and 18 can be driven by a separate motor so that the first spinner 17 can rotate independently from the second spinner 18. Thus, each of the spinners 17 and 18 can rotate at a local tangential flow velocity of the liquid/gas or liquid/vacuum interface (in case system 10 is evacuated) of the rotation fluid and vortex cavity. When the ends of the vortex cavity touch a stationary wall (e.g. the surfaces 17a, 18a of non-rotating spinners 17, 18) shear layers develop at the spinner 17, 18 due to the no-slip (zero velocity) condition on the wall 17a, 18a. Those shear layers may be responsible for the formation of high-frequency ripples on the vortex interface. Adjusting the rotational velocity of the spinners 17, 18 to match the local rotational velocity on the surface of vortex is expected to eliminate such shear layers and suppresses (prevents) development of the ripples. In one implementation the system 10 can comprise a controller in communication to the motor 27 to adjust a rotational speed of the spinners 17 and 18. The spinners 17, 18 can rotate at the same or different speed adjusted carefully to match the local flow velocity of the fluid so that the surface of the created vortex is smooth and free of any ripples. In case of a generally cylindrical vortex cavity, both spinners 17 and 18 can rotate at the same speed and thus can be driven by a same motor. The spinners 17 and 18 can be connected with a shaft 21 that is driven by such motor. In one implementation, the motor cart be omitted and the spinners 17 and/or 18 can be driven by the fluid motion. For example, the spinners 17, 18 can comprise a plurality of fins 23 connected to and extending away from a bottom surface 17b, 18b of the respective spinners 17, 18 such that the plurality of tins are oriented substantially perpendicular to a rotational direction of the rotation fluid so that the fins 23 can provide friction surface for spinning the spinners 17, 18 at the desired speed.

Figure 3B:
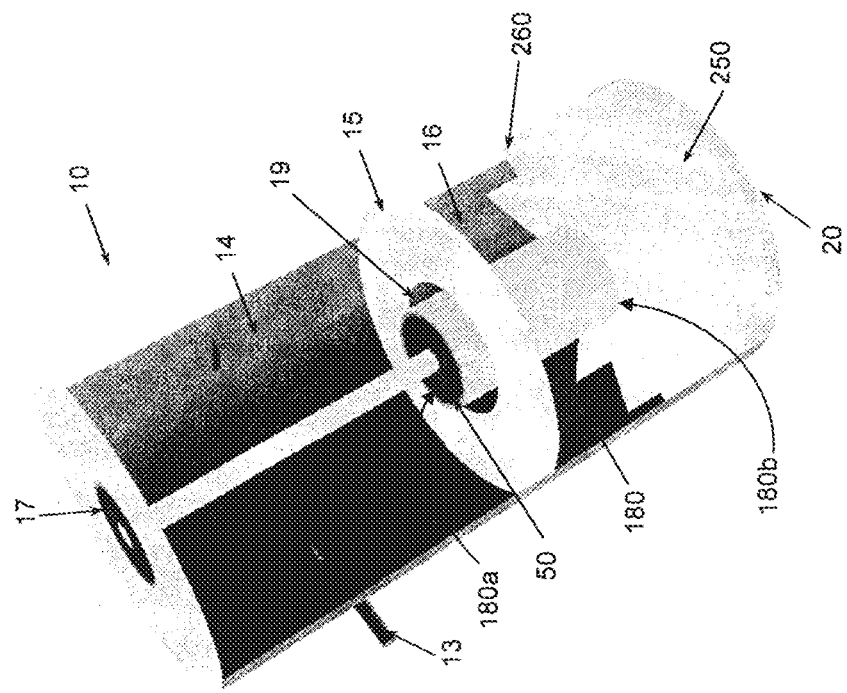
FIG. 3B is a schematic perspective view of a computer generated numerical model of an apparatus for generating a vortex cavity according to yet another embodiment.
Figure 3A:
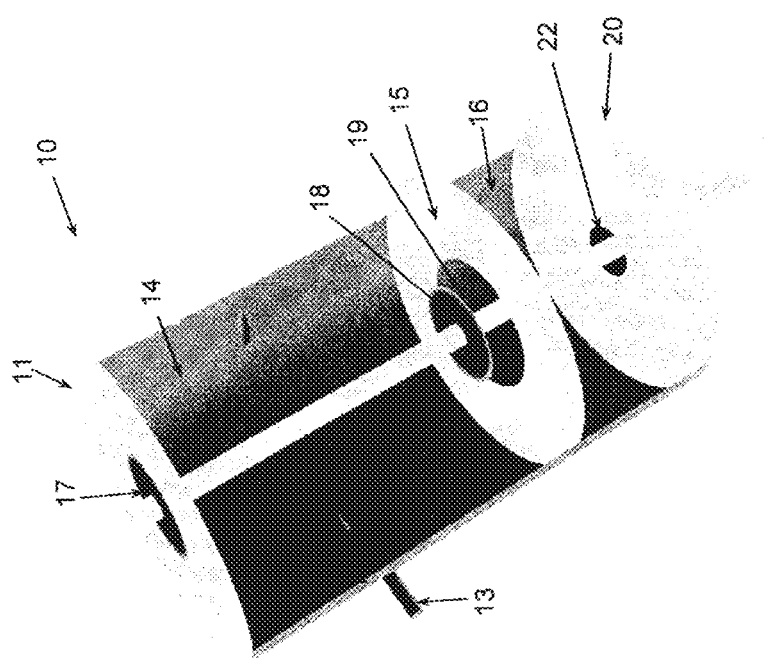
FIG. 3A is a schematic perspective view of a computer generated numerical model of the apparatus shown in FIG. 2A.
Figure 5B:
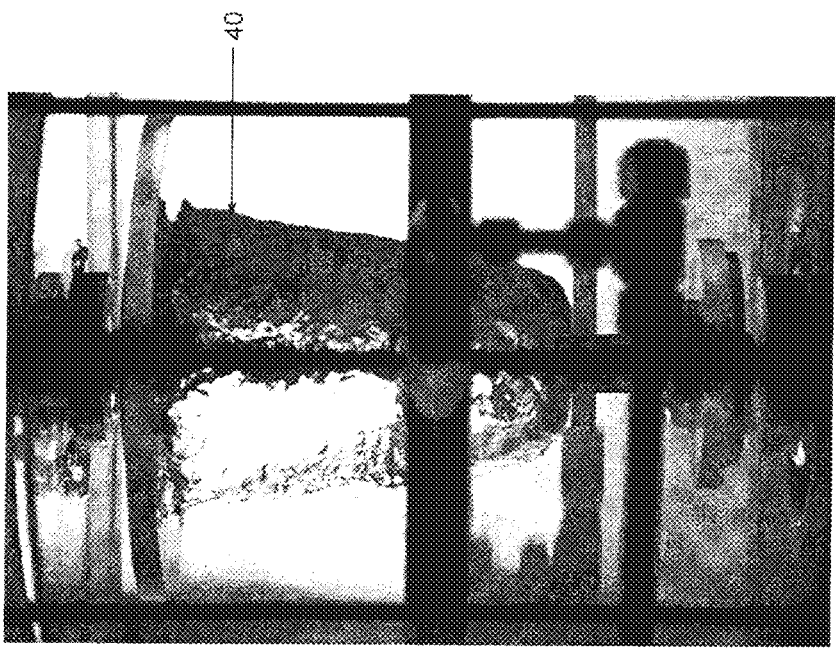
FIG. 5B is a schematic view of a vortex cavity formed when the first spinner and the second spinner of the apparatus are stationary.

FIG. 3A is a schematic perspective view of a computer generated numerical model of the vortex generation system 10 of FIGS. 2A and 2B. A number of simulations have been conducted to explore different parameters of the system 10 and its implementation in a plasma compression system 200 (FIG. 6). Simulations were performed using open source computational fluid dynamics software OpenFOAM®. A size and geometry of the model illustrated in FIG. 3A corresponds to the experimental system 10 of FIGS. 2A and 2B using the rotating disks 17 and 18. FIG. 4A is a schematic perspective view of a vortex formation in the apparatus shown in FIG. 3A. Only a lower portion of the first chamber 14 with the second spinner 18 and the second chamber 16 are illustrated in FIG. 4A for simplicity. The simulations have shown that a stable vortex cavity 40 with smooth surface can be obtained using the spinners 17, 18 when such spinners rotate at a speed close to or at a local flow velocity of the vortex, such as for example about 80 rad/s. The results of the simulations have been supported by the experiments as well. Vortex start-up and formation process in the simulation matches that of the system 10 illustrated in FIGS. 2-6.

FIG. 3B shows a schematic perspective view of a computer generated numerical model of another embodiment of the vortex generation system 10 while FIG. 4B is a schematic perspective view of a vortex formation in the apparatus shown in FIG. 3B. This embodiment can also include two spinners as the apparatus of FIG. 3A. The first spinner 17 can be a disk (similar to the disk 17 of FIGS. 2A and 3A) while the second spinner 180 can be a ring with a central opening or a rotating hollow tube. In the illustrated embodiment of FIG. 3B, the second spinner 180 is a hollow tube with a central opening surrounded with a solid rim 50. The hollow tube 180 can have a cylindrical or a conical shape or any other suitable shape or combination thereof with a bottom end 180b, a rotatable face surface (a top end) 180a and a sidewall 180c extending between the ends 180a and 180b. The thickness of the sidewall 180c defines the central opening of the tube 180 and a width of the solid rim 50 at the face surface 180a. A width of the solid rim 50 at the face surface 180a should be sufficient to support the vortex cavity. Once the vortex cavity is formed it can sit on the solid rim 50 of the tube 180. In one embodiment, the first spinner can also be a hollow tube or a ring 170 (see FIG. 6) similar to the spinner 180. Both spinners can be spun by the motor 27 (FIG. 6) or can be driven by the fluid rotation. As illustrated in FIGS. 3B and 4B the bottom end 180b of the second spinner 180 can extend into the second chamber 16 of the vessel 12 as long as the rotating face surface 180a is slightly above the opening 19. In alternative implementation, a bottom part of the second chamber 16 can be filled with plurality of separation baffle chambers 250 which can break up and "calm down" rotational flow of the rotation fluid before it is drained out from the second chamber 16 through the outlet 22. As illustrated in FIGS. 3B and 4B the baffle chambers 250 can be formed by a plurality of flaps 260 that are mounted on an inner side of the bottom wall 20 so that the flaps 260 project. upwardly from the bottom wall 20 into the second chamber 16 forming the baffle chambers 250. The rotation fluid from the baffle chambers 250 can flow into the circulating system 24 through the draining outlet 22. In one embodiment, the flaps 260 can be omitted or mounted into the piping network 28 of the circulating system 24 so that the flow of the rotation fluid is slowed down.

Figure 5A:
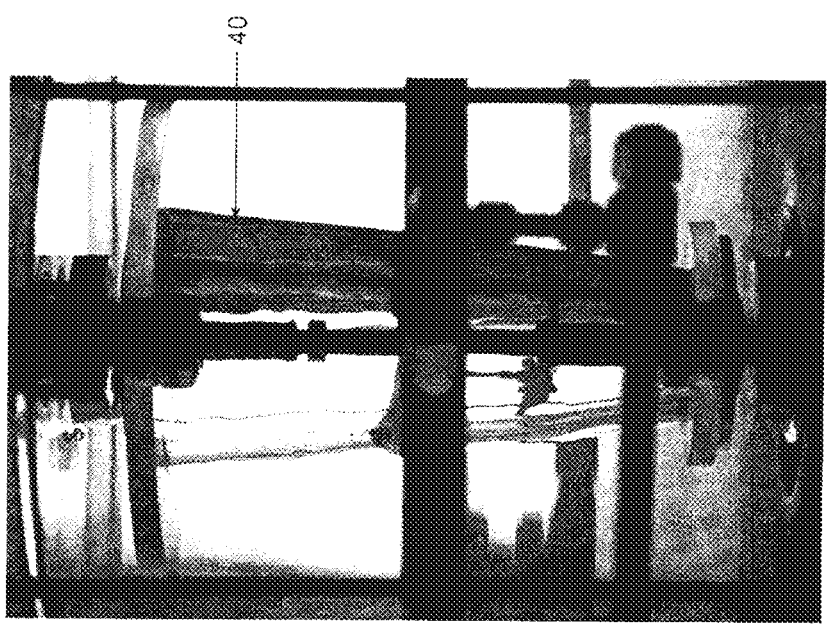
FIG. 5A is a schematic view of a vortex cavity formed when a first spinner and a second spinner of the apparatus rotate at a pre-determined speed.
Figure 6:
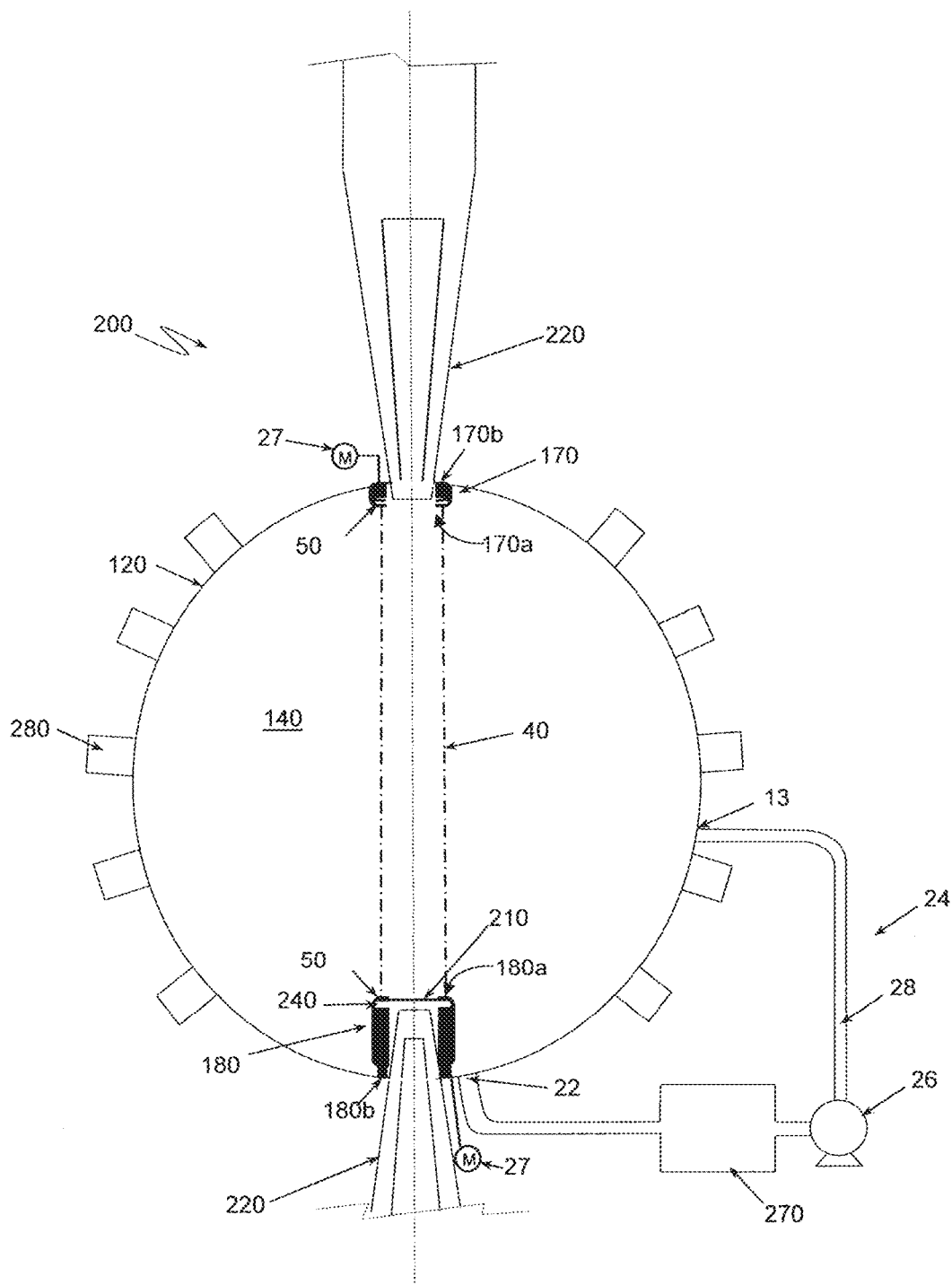
FIG. 6 is a schematic cross-sectional view of a plasma compression system comprising one embodiment of the apparatus for generating a vortex cavity.

FIGS. 5A is a schematic view of a vortex cavity formed when the first spinner 17 and the second spinner 18 of the apparatus 10 rotate at a pre-determined speed. The vessel 12 is filled with water so that the process of vortex formation can easily be observed, i.e. the rotation fluid is water. 5B is a schematic view of a vortex cavity formed in the rotating water when the first and second spinners 17, 18 of the apparatus 10 are stationary. As illustrated in FIG. 5A, the vortex cavity 40 formed between the first spinner 17 and the second spinner 18 when the two spinners 17 and 18 rotate at a predetermined rotational speed has a wall that is smooth and free of the ripples. On the other hand and as illustrated in FIG. 5B, when the first and second spinners 17 and 18 are stationary the generated vortex 40 comprises unstable surface with clearly shown ripples.

FIG. 6 shows an example of a plasma compression system 200 employing a vortex generation system 10. The system 200 comprises a plasma compression chamber 120, having an outside wall that defines an inner space 140 of the plasma compression chamber 120. The inner space of the chamber 120 can be partially filled with a rotation fluid, such as, for example a liquid medium. The liquid medium can be a molten metal, such as lead, lithium, or sodium, or an alloy, combination, or mixture of such metals. The chamber 120 comprises at least one opening in which a tip of a plasma generator 220 can be inserted to inject plasma into a vortex cavity 40 in the chamber 120. The opening can be formed at a pole of the chamber 120 or equatorially or at any other suitable position without departing from the scope of the invention. As mentioned herein above, the chamber 120 can have different sizes and shapes without departing from the scope of the invention. For example, the plasma compression chamber 120 can be cylindrical, spherical, ellipse, conical or any other suitable shape or combination thereof. The chamber 120 can be at least partially evacuated using a pumping system (not shown).

A plurality of pressure wave generators 280 can be configured to create a pressure wave in the medium contained within the chamber 120. The pressure wave generators 280 can generate a pressure wave in the medium by impacting the outside wall of the chamber 120. The plasma generator 220 can be a two stage Marshall gun type of injector for generating and accelerating the plasma that is then injected into the compression chamber 120. The plasma can be a compact toroid (CT) such as, e.g., a spheromak, which is a self-sustained toroidal plasma with both toroidal and poloidal magnetic fields. In other embodiments, the CT can be a field-reversed configuration (FRC) of plasma, which also has a toroidal magnetic topology, but can be more elongated in the axial direction with an outer surface being similar to a prolate ellipsoid, and which has a poloidal magnetic field, with small or zero toroidal magnetic field component, or any other compact toroid configuration such as a tokamak, stellarator or reversed field pinch (RFP). The plasma generator 220 is aligned and inserted in a fluid tight manner into the opening formed in the outer wall of the chamber 120. In the illustrated example, the chamber 120 has two openings at each of its pole so that there are two generators 220 (one per each opening). The plasma generated in each of the generators 220 is injected into the vortex cavity 40 formed between the first spinner 170 and the second spinner 180 using the vortex generation system as described herein above. The injected two plasmas can then merged within the vortex cavity 40.

FIG. 6 further shows the first spinner 170 configured as a ring and the second spinner 180 configured as a hollow tube. The spinners 170 and 180 can further comprise a movable lid 210 that is configured to cover the respective face ends 170a and 180a during the operation of forming and stabilizing the vortex cavity 40. The ends 170b, 180b of the respective spinners 170, 180 can be opened and can be in fluid communication with a plasma generator 220 so that plasma can be injected into the vortex cavity 40 through the hollow spinners 170, 180. The lid 210 can be movable from a first position in which the lid 210 closes the face end 170a, 180a (see the second spinner 180 in FIG. 6 showing the lid 210 covering the face end 180a) to a second position in which the face end 170a, 180a is opened (see the first spinner 170 showing tile lid 210 retracted within a slit 240). So, the lid 210 can be retracted into the groove or slit 240 once the stable vortex 40 is sitting between the first and the second spinners 170 and 180 supported by the solid rim 50 of such spinners. The slit 240 can be formed at an inner side of the sidewall of the respective spinners 170, 180, so that the lid 210 can be retracted within such slit when in the second position. The lid 210 can be movable between its first and second position using a driver (not shown) that can be an electrical or a mechanical driver. The drive of the lid 210 can be controlled by a controller (not shown) that can trigger the driver to drive the lid 210 to close or open the end 170a, 180a of the respective spinner 170, 180. In order to generate a stable vortex cavity using the system 10, the lid 210 can be in its first position closing the face ends 170a, 180a of the respective spinners 170, 180. The system can be filled with a pre-determined volume of fluid calculated based on the expected vortex dimensions and system parameters.

In one mode of operation, the pumping system 24 can start pumping and circulating the rotation fluid and forming the vortex cavity 40 due to the rotational flow of the rotation fluid. The presence of a spinner (rotating or stationary) above the draining outlet 22 is expected to prevent the vortex cavity 40 from extending into the draining outlet 22. The draining outlet 22 can be an annular ring formed around the chamber's opening into which the tip of the plasma generator 220 is inserted in a fluid tight manner; the centre of the annular ring can be on the axis of the spinners 170, 180. The spinners 170, 180 can be rotated with a velocity that matches the velocity of the rotating fluid/vortex cavity interface (liquid/gas or liquid/vacuum interface), which is expected to eliminate the development of a boundary layer on the wall (face surface 170a, 180a) of the spinner 170, 180 which in turn is expected to prevent formation of high frequency ripples on the vortex surface. Once a stable vortex cavity 40 sits between the spinners 170, 180, the lid 210 is retracted in its second position opening the end 170a, 180a of the spinners 170 and 180 so that the vortex cavity 40 is brought in communication with the plasma generators 220 and plasma can be inserted into the vortex cavity 40.

In one implementation, illustrated in FIG. 6, a chamber 270 (big volume to form a free surface) can be formed before the pump 26 so that the fluid flow can break up and slow down at the chamber 270 to eliminate any trapped gas bubbles that may occur in the fluid flow before the fluid enters the pump 26.

A person skilled in the art would understand that the formed vortex cavity 40 can be oriented vertically (as illustrated in FIGS. 2-6) or horizontally without departing from the scope of the invention. For example, the spinners 17, 170 and 18, 180 can be mounted at the side wall of the chamber 12, 120 so that the fluid can be injected into the chamber from a plurality of ports 13 formed at the bottom and/or the top of the chamber 12, 120 while it can be drained out from a draining opening formed at the side wall of the chamber 12, 120. The rotational flow of the fluid within the chamber need to be high enough to account for the gravitational force to successfully generate a vortex cavity that extends horizontally and sits between so positioned spinners 17/170 and 18/180.

The examples of the described vortex generation systems can be used in plasma compression systems such that the plasma inserted into the vortex cavity 40 can be compressed by a converging pressure wave generated by the pressure wave generators 280. Such converging pressure wave collapses the vortex cavity 40 compressing the plasma trapped therein. In addition such systems can be used for research purposes in studying vortex formation, dynamics and interactions or in various particle separation systems.

While particular elements, embodiments and applications of the present disclosure have been shown and described, it will be understood, that the scope of the disclosure is not limited thereto, since modifications can be made without departing from the scope of the present disclosure, particularly in light of the foregoing teachings. Thus, for example, in any method or process disclosed herein, the acts or operations making up the method/process may be performed in arty suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and sub-combinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The example calculations, simulations, results, graphs, values, and parameters of the embodiments described herein are intended to illustrate and not to limit the disclosed embodiments. Other embodiments can be configured and/or operated differently than the illustrative examples described herein. Indeed, the novel methods and apparatus described herein may be embodied in a variety of other forms; furthermore, various omissions, substitutions and changes in the form of the methods and systems described herein may be made without departing from the spirit of the inventions disclosed herein.

What is claimed is:

1. An apparatus for generating a vortex cavity in a rotating fluid, the apparatus comprising:
   a vessel comprising:
      the rotating fluid;
      a first spinner having a rotatable face surface rotatably mounted inside the vessel;
      a second spinner spaced from the first spinner and having a rotatable face surface rotatably mounted inside the vessel, the second spinner rotatable face surface being coaxial with and facing the first spinner rotatable face surface;
      a fluid circulating system comprising at least one fluid injection inlet in fluid communication with the inside of the vessel and at least one fluid draining outlet in fluid communication with the inside of the vessel, the fluid circulating system configured such that the fluid is injected into the vessel and drained out of the vessel;
      at least one motor configured to rotate the first spinner and the second spinner;
      a controller in electrical communication with the at least one motor to adjust a rotational speed of the first spinner to match a local tangential flow of the rotating fluid at the location of the first spinner, and to adjust a rotational speed of the second spinner to match a local tangential flow of the rotating fluid at the location of the second spinner;

the vortex cavity in the fluid extending between the first spinner and the second spinner, the vortex cavity having a first end that sits on the rotatable face surface of the first spinner, and a second end that sits on the rotatable face surface of the second spinner, whereby a wall of the vortex cavity is substantially free from ripples.

2. The apparatus as claimed in claim 1, wherein the at least one draining outlet is coaxial with the first and second spinners.

3. The apparatus as claimed in claim 1 further comprising a piping network fluidly coupled to a fluid pump and to the at least one fluid injection inlet and the at least one fluid draining outlet, such that the rotation fluid discharged from the vessel via the at least one fluid draining outlet is recirculated back into the vessel via the at least one fluid injection inlet.

4. The apparatus of claim 1, wherein the rotatable face surface of at least one of the first and second spinners further comprises a central opening surrounded by a solid rim having a width sufficient to support the vortex cavity.

5. The apparatus of claim 4, wherein the at least one of the first and second spinners is a hollow tube and the rotatable face surface comprising the central opening surrounded by the solid rim is at one end of the hollow tube.

6. The apparatus of claim 5, wherein the hollow tube further comprises an inner sidewall with a slit extending along a circumference thereof, a movable lid, and a driver in communication with the movable lid, the driver being configured to drive the movable lid between a first position that closes the central opening, and a second position that does not close the central opening.

7. The apparatus of claim 1, wherein the at least one motor comprises two motors, a first motor coupled to the first spinner and a second motor coupled to the second spinner.

8. The apparatus of claim 1, wherein the first and second spinners each further comprise a plurality of fins connected to and extending away from a bottom surface of the first and second spinners such that the plurality of fins are oriented substantially perpendicular to a rotational direction of the rotating fluid.

9. The apparatus of claim 1, further comprising multiple fluid injection inlets arranged circumferentially around a side wall of the vessel and positioned such that the rotation fluid is injected tangentially into the vessel, and wherein the vessel comprises a first end in proximity to the first spinner and a second end in proximity to the second spinner, and the at least one draining outlet comprises one draining outlet located at the second end of the vessel and spaced from the second spinner.

10. The apparatus of claim 9, further comprising another draining outlet located at the first end of the vessel and spaced from the first spinner.

11. The apparatus of claim 1, wherein the vessel further comprises a separating wall with at least one opening and which separates the inside of the vessel into a first chamber and a second chamber, wherein the first and second spinners are positioned within the first chamber with the second spinner mounted to the separating wall and spaced from the at least one opening in the separating wall, and wherein the at least one fluid injection inlet is in fluid communication with the first chamber and the at least one draining outlet is in fluid communication with the second chamber, and wherein the at least one opening is positioned in the separating wall to allow the rotation fluid to drain from the first chamber into the second chamber.

12. The apparatus of claim 11, further comprising a plurality of flaps mounted at a bottom of the second chamber, the plurality of flaps forming baffle chambers such that the rotation fluid flowing in the second chamber is slowed upon contact with the baffle chambers.

13. The apparatus of claim 1, further comprising a plurality of flaps mounted in the at least one draining outlet, the plurality of flaps forming baffle chambers such that the fluid flowing into the at least one draining outlet is slowed upon contact with the baffle chambers.

14. The apparatus of claim 1, wherein the vessel comprises an opening to provide access to an inner space of the vessel, the apparatus further comprising:

a plasma generator configured to generate plasma and having a discharge outlet in fluid communication with the inner space of the vessel through the opening such that generated plasma can be discharged into the vortex cavity of the vessel.

15. The apparatus of claim 14, wherein the rotatable face surface of at least one of the first and second spinners further comprises a central opening surrounded by a solid rim having a width sufficient to support the vortex cavity, and wherein the central opening is aligned with the discharge outlet of the plasma generator and the opening of the vessel such that plasma discharged by the plasma generator enters the vortex cavity.

16. The apparatus of claim 14, further comprising a pressure wave generator configured to generate a pressure wave in the rotating fluid, the generated pressure wave collapsing the vortex cavity and compressing the plasma trapped therein.

* * * * *